Dec. 17, 1935.                M. COUSIN                2,024,848
                    INTERNAL COMBUSTION ENGINE
             Filed Dec. 1, 1927           5 Sheets-Sheet 1

Inventor:
Maurice Cousin
BY Townsend & Decker
ATTORNEYS.

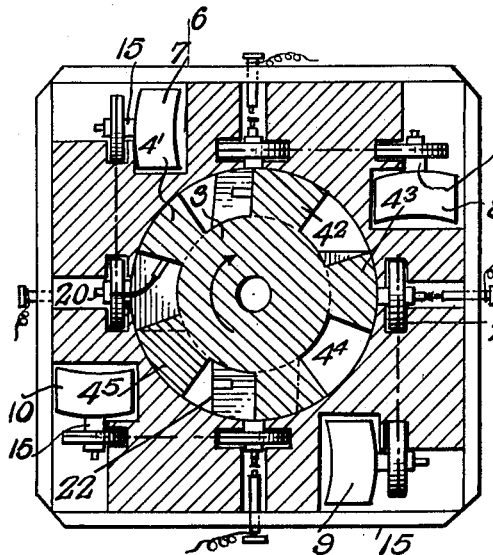

Dec. 17, 1935.   M. COUSIN   2,024,848
INTERNAL COMBUSTION ENGINE
Filed Dec. 1, 1927   5 Sheets-Sheet 3
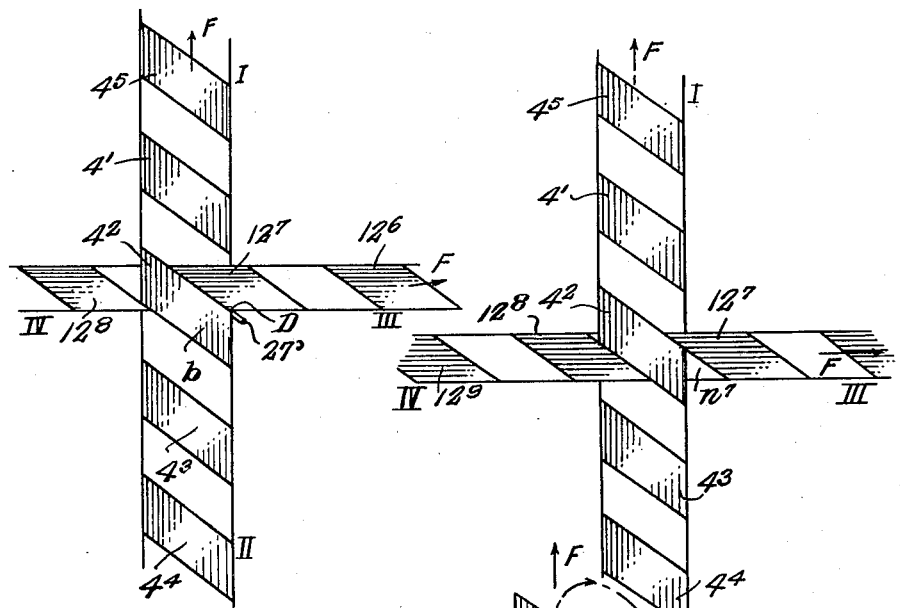
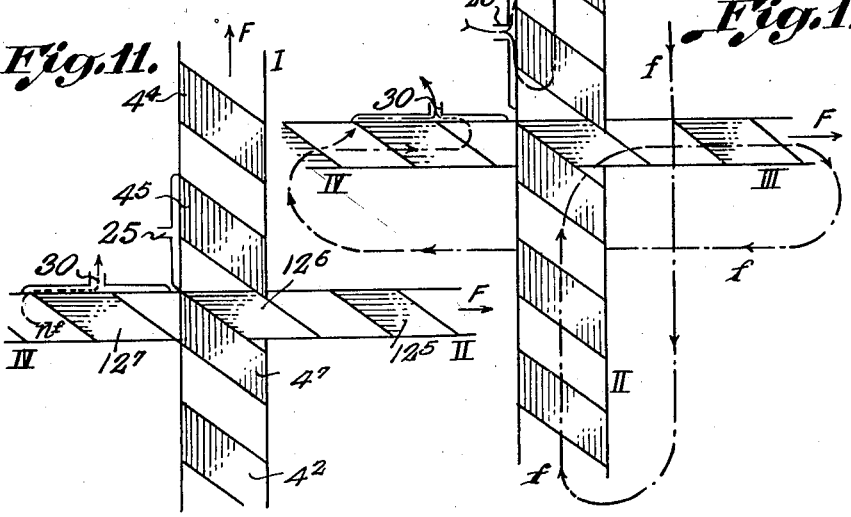
Inventor:
Maurice Cousin
BY Townsend & Decker
ATTORNEYS Dec. 17, 1935. M. COUSIN 2,024,848
INTERNAL COMBUSTION ENGINE
Filed Dec. 1, 1927 5 Sheets-Sheet 4
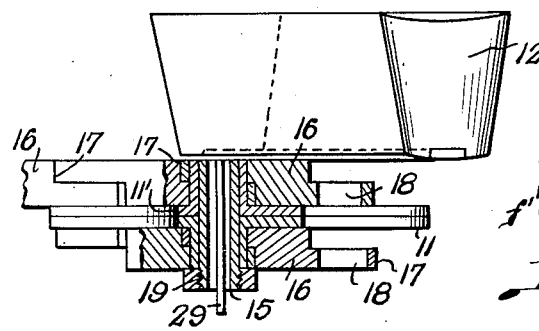
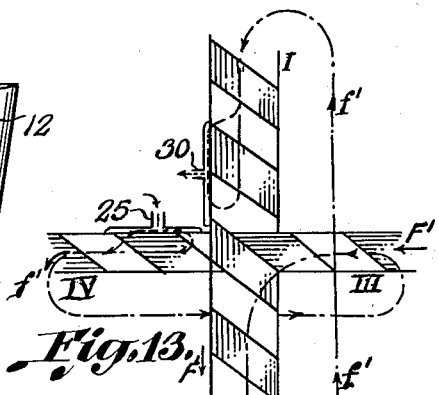
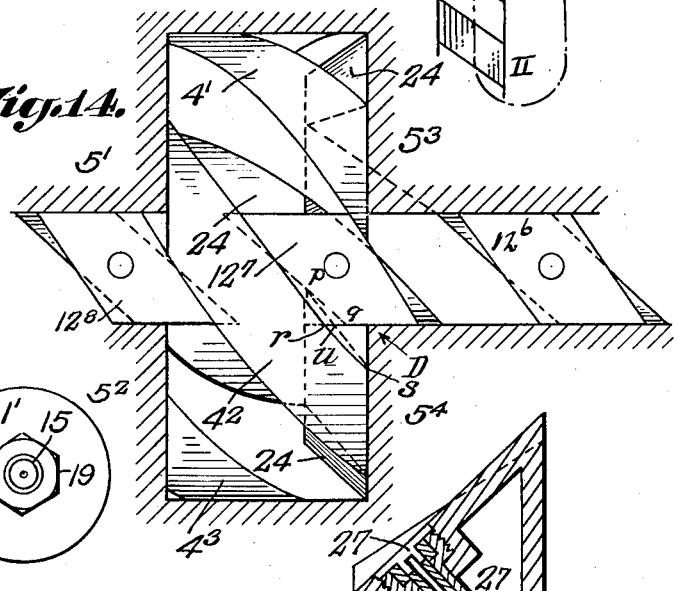
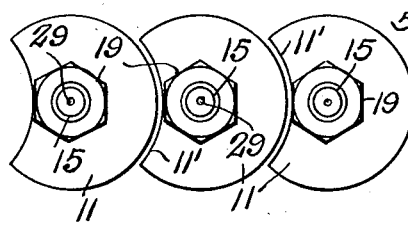
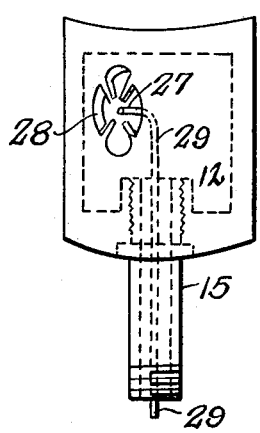
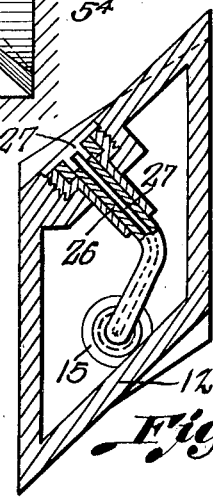
Inventor:
Maurice Cousin
by Townsend & Decker
ATTORNEYS.

Patented Dec. 17, 1935

2,024,848

UNITED STATES PATENT OFFICE 2,024,848

INTERNAL COMBUSTION ENGINE

Maurice Cousin, Paris, France

Application December 1, 1927, Serial No. 236,905
In France December 11, 1926

6 Claims. (Cl. 123—8)

This invention relates to internal combustion engines, and particularly to a non-reciprocating or continuous rotary type of such engines.

My invention has for its object to provide an internal combustion engine of a type in which the variable capacity of chambers produced by the meshing of a plurality of toothed members (like sprockets and gears) may be utilized, and to obtain in simplest possible form the several operations of intake, compression, expansion and exhaust.

These objects are attained by utilization of an appropriately housed pair of members each having elements intermeshing with corresponding elements of the other member and arranged in progressive series such that the one series continuously crosses the path of the other, preferably perpendicularly at the point of crossing. As one specific embodiment of the invention, one of these members is illustrated as very similar to a spiral gear, and for convenience will be referred to as the gear member, although it is to be understood I do not limit the invention to the use of a member resembling a gear as a progressive series of elements may be otherwise obtained. The other member is represented as of a conveyor type, comprising an endless chain passing around drums and carrying the series of elements at spaced intervals so as to intermesh with the elements of the gear member. The gear-like member is contained within a cylindrical chamber, the elements of the gear member having sliding contact with the walls of this chamber so the spaces between the elements are substantially gas-tight working chambers.

A form of construction of an engine according to the invention is exemplified in the attached drawings, in which Figure 1 is a front elevation, partly in section on line I—I of Fig. 2, of an engine according to my invention;

Figure 3 is a cross sectional view as upon line III—III of Fig. 2;

Figure 4 is a view similar to Fig. 2, but with the gear-member removed to show particularly the inwardly projecting shape of the casing;

Figures 5 to 13 show diagrammatically the different steps in the working as effected by the crossing series of elements;

Figure 14 is a fragmentary view similar to Figure 2, on larger scale, showing the two intersecting series of elements and the provision for passage of gas from compression to expansion;

Figure 15 is an elevation of one of the elements with adjoining links of the chain, partly in section;

Figure 16 is a corresponding elevation of the chain links;

Fig. 17 is a detailed elevation of an element, showing the electrical fuel igniting means;

Figure 18 is a cross-sectional view thereof;

Figure 1:
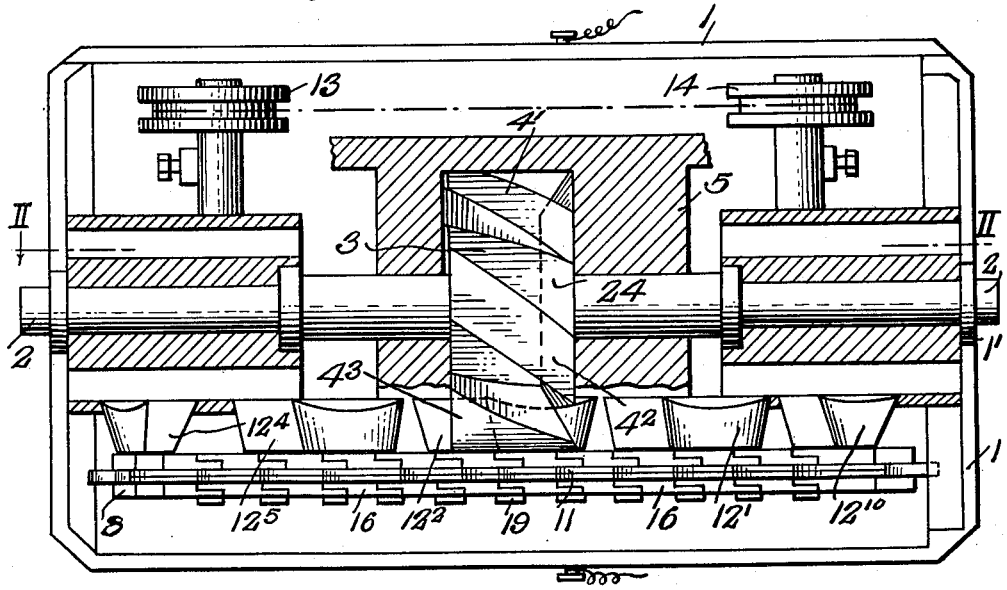
Figure 2:
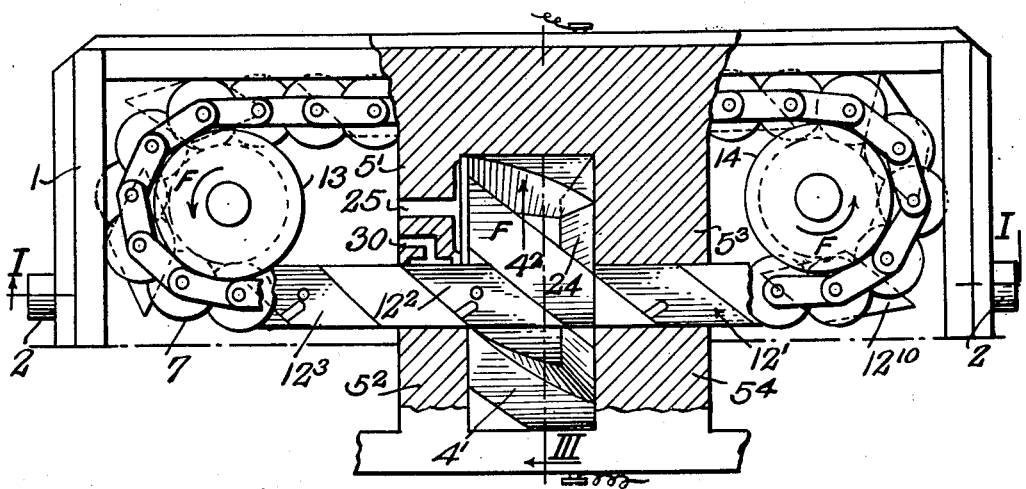
Figure 2 is a sectional plan thereof, the section being taken substantially on line II—II of Fig. 1.
Figure 19:
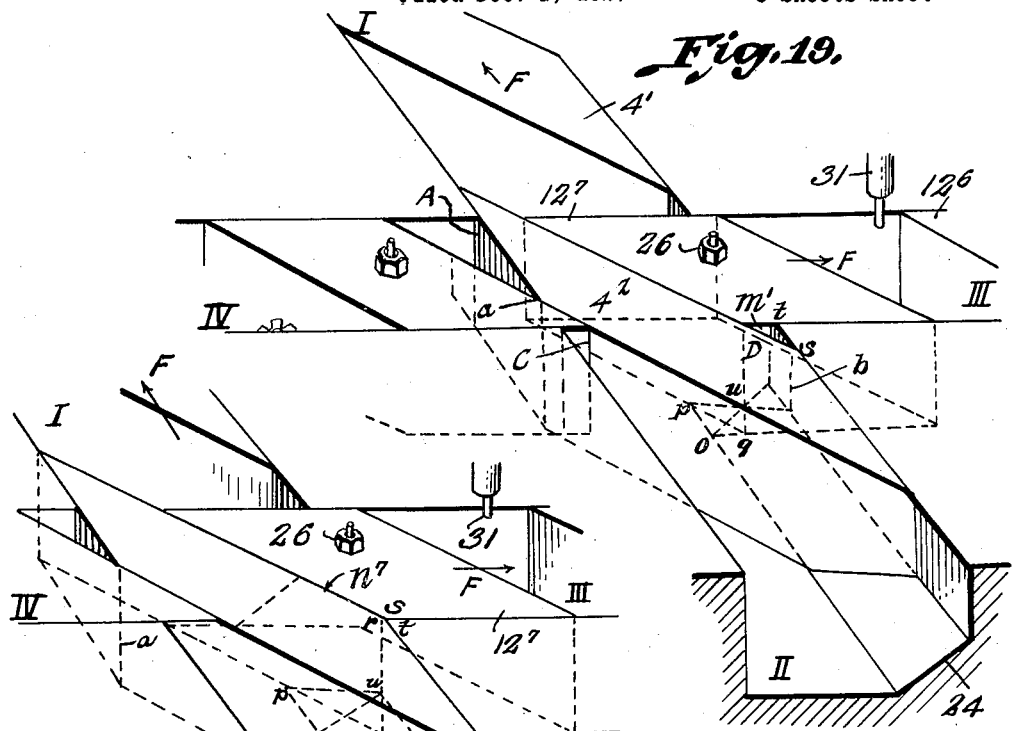
Figure 20:
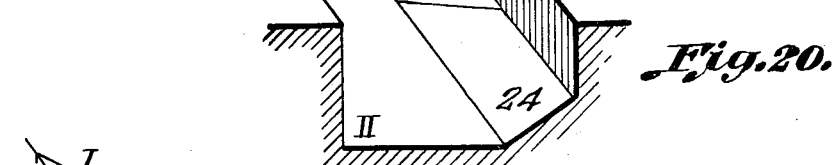
Figure 21:
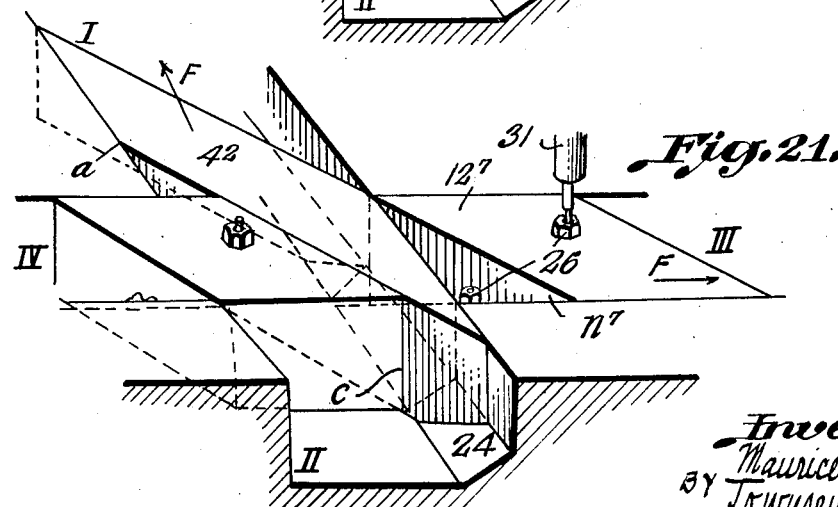

Figure 19 is a diagrammatic perspective view of the compression stage existing between the diagrammatic conditions indicated by Figs. 7 and 8; and Figures 20 and 21 are similar diagrammatic perspective views of further conditions existing between the conditions illustrated by Figs. 19 and 8.

In said drawings, there is provided a bed-frame 1 at the end portions of which are bearings 1' in which an axle 2 is mounted. Midway of this axle is shown a gear-like member 3 having in the present instance five teeth, $4'$, $4^2$, $4^3$, $4^4$ and $4^5$ which constitute the elements of the first series. This gear-like member rotates within a closed casing 5. Parallel to the axle is provided a passage 6 directed toward the ends of the elements for admitting entry and departure of the transverse or second series of elements forming part of the second member 7. I preferably provide a plurality of these second members, having shown the same as disposed ninety degrees apart around the first or gear-like member and designated successively by numerals 7, 8, 9 and 10. While each of these second or chain-like members may carry any desired number of elements, I have discovered a certain regularity is obtained in the successive explosions by combining with a gear-like member having $n$ teeth or elements, $(n \pm 1)$ chain-like members supporting elements. This combination gives explosions spaced from each other by $$\frac{360}{n(n \pm 1)}$$

degrees for each revolution of the gear-like member. In the example herein illustrated wherein five elements have been shown on the gear-like element, the interval between the explosions will accordingly be, by this formula $$\frac{360°}{5(5-1)} = 18°$$

The chains proper are constituted by partially cut-away discs 11 on certain of which are secured the helical elements designated by numeral 12 (or numeral 12 with an exponent). The chains 7, 8, 9 and 10 move along a generatrix of the gear 3 and rotate on terminal wheels or drums 13, 14. The turning planes of the chains, i. e. the plane of the wheels 13 and 14, is parallel to the axis of the gear-like member and does not pass through said axis.

The elements 12 are mounted, as shown in Figures 15 and 16 by means of a hollow shaft 15 forming the pivotal joints of the chain. Discs 11 have hubs projecting therefrom and rotatable upon these hollow shafts 15. Articulated links 16, 16, fitting with each other by their rounded ends 17, have bearing holes 18 by which the links are pivotally carried upon the said hubs of the discs 11. Said discs 11, as indicated above, are cut-away crescent-like at 11' so as to fit upon the adjacent rounded edge of the adjoining disc, and thus present a continuous wall. The inner end of the hollow shaft 15 is preferably threaded into the helical element 12, and a nut 19 is screwed onto the other or outer end.

In the straight portions of travel, the chains 7, 8, 9, and 10 thus formed, are guided in the bed-frame 1 by the edges of the articulated links 16 which move along slots 20 provided in the bed-frame 1. In the curved portions of the track, the chains are guided by the turning wheels or drums 13, 14.

The chamber in the closed casing 5 for the gear-like member 3 is provided with an inwardly projecting conical portion 24 (see Fig. 4) and the teeth 4'–4⁵ of the gear are similarly notched or cut at their ends with a form of a corresponding part of the conical surface. The purpose of the projecting portion and of the notch will be explained below with regard to the working of the engine.

It is assumed that the series move in the direction of the arrows F (see Figs. 2, 5–12). The combustible gas is introduced in the gear casing through a canal 25, while the burnt gases are evacuated through a canal 30 formed in a part of the casing contiguous to the passage for the chain.

If desired, the engine may be constructed to operate in the direction of the movement of arrows F'', Figure 13, in which case the fuel is introduced by canal 30 and the burnt gases evacuated through canal 25.

The ignition is effected by plugs 26 preferably within the elements 12, as shown in Figures 17 and 18. Said plugs comprise an electrode 27 protruding through element 12 to its outside through an opening 28 provided in the element. This protruding electrode is integral with or connected to an insulated wire 29 passing through and terminating outside of the hollow securing shaft 15 of the element 12 so as to wipe or pass contiguous to a suitable source 31 (Fig. 3) of electric current.

The working of the engine is as follows:—

For convenience, the receding portion of the first series of elements past the second series is designated in Figures 5 to 13, and in the following description as branch I, whereas the portion of the first series approaching the second series is designated as branch II. Similarly the receding and approaching portions of the second or chain-like series are designated as branches III and IV respectively.

(1st) *Suction*.—The gaseous mixture is introduced from a carburetor (not shown) through the canal 25 which is continuously in communication with the branch I of the gear casing. The elements are supposed to be in position shown in Figure 5. When the angle $a$ of the gear tooth or element 4' has left the crossing point A, a working chamber $m'$ begins to be formed between the teeth 4' and 12² while simultaneously chamber $m^5$ previously formed between the teeth 4⁵ and 4' is still open to the intake (Fig. 5). The elements move in branch I in the direction of arrow F, the chamber $m'$ increases and reaches a maximum volume when the angle $b$ of the tooth 4² has reached the crossing point B. The series continue to move, (the diagram being developed) the chamber $m'$ comprised between the elements 4' and 4² of the gear passes from branch I into branch II, keeping its maximum volume (Fig. 6).

(2nd) *Compression*.—When the angle $a$ of the element 4' reaches the crossing point C (Fig. 7), the meshing of the element 4' with the chain element 12⁷ begins, the volume of the chamber $m'$ begins to decrease and the contents are compressed. This volume decreases (Fig. 8) until the angle $b$ of the tooth 4² has reached the crossing point D (Figs. 9 and 21). At this moment the volume of chamber $m'$ has greatest compression and the ignition is produced at the suitable time by means of the plug shown diagrammatically at 26 in the angle D (Fig. 9), or in the chain element 12⁷ (Figs. 19, 20 and 21). I provide a small chamber in the angle D of suitable size to obtain a combustion chamber of appropriate volume according to the compression ratio.

(3rd) *Expansion*.—The volume of the chamber $m'$ passes automatically from the branch II to the branch III of the cross, and said chamber is now comprised between the gear tooth 4² and the chain tooth 12⁷ (Fig. 10). Such a chamber may be thus called $n^7$. The compression due to explosion propels the element 12 of the chain-like member in the direction of the arrow F and the chamber $n^7$ is finally comprised between the teeth 12⁷ and 12⁸ and passes from branch III to branch IV of the cross (Fig. 11).

(4th) *Exhaust*.—As soon as chamber $n^7$ (filled with burnt gases) communicates with the exhaust canal 30 provided in the passage 6, the gases escape and the cycle is closed.

Thus the gaseous mixture or fuel and the gases of combustion follow a track shown in Figure 12 by the arrowed line $f$. If on the other hand (Fig. 13) the engine is built for moving the series in the reverse direction, i. e. following the arrow F'', the track of the gases will be that shown by the arrowed line $f'$ in Fig. 13.

It is to be noted, that according to my invention, I have obtained a complete cycle by two series of elements meshing and crossing each other, the gases being carried in the first series (branches I and II) for the "suction" and the "compression" and carried in the second series (branches III and IV) for the "expansion" and the "exhaust", the movement of the said series affecting automatically the opening and the closing of the chambers formed in each series.

A particular arrangement of the combustion chamber in angle D is shown in Figures 4, 14 and 22. A conical projection is provided in the casing of the gear and the end of the gear bears against said projection by a corresponding female cone. It is to be seen that in the angle D a fraction of combustion chamber (at the apex of the elements) called $m'$ in Fig. 8 is limited by the triangular basis $r\,s\,t$ (Fig. 14), while another chamber is already formed at the bottom, which chamber (called $n^7$ in Fig. 10) is a fraction of the expanding chamber and is limited by a triangular basis $o\,p\,q$. These chambers have the form of a pyramid opposed by their common apex $u$. The chamber $m'$ decreases when the chamber $n^7$ increases, the second absorbing the first. The structure described involves three relatively moving parts which necessarily have some clearance, to form the two chambers having the common apex $u$. It is therefore physically impossible to make the apex between these two chambers impassable to gases, and it is furthermore not desired to make it impassable, since it is by virtue of this ability of gases to pass from the compression chamber $m^1$ to the expansion chamber $n^7$ which introduces the combustible gases to the explosion chamber. As soon as the edge or angle $b$ of tooth $4^2$ moves as shown in Fig. 22 into juxtaposition with the face of element $12^7$, the compression chamber has become reduced to zero and the expansion chamber becomes the space in branch III between the said element and tooth, as shown in Figs. 10 and 22. The parts then have extended surface engagement and there will then be no leakage of the combustible gases before explosion nor of the burnt gases after explosion.

Having now described my invention, I claim:

1. An internal combustion engine comprising a tight casing, one helically threaded screw within said casing, and, meshing with said screw, one chain of interconnected helical thick projecting members, which chain follows a track of suitable shape by moving along one generatrix of said screw, said members, screw threads and casing cooperating to form working chambers, means for drawing a gas mixture into working chambers formed between the threads of said screw to compress the gas mixture on movement of said screw and chain each working chamber upon attaining maximum compression of the mixture thereupon opening directly into an expansion chamber wherein the mixture may be exploded for producing an expansion of the expansion chamber and means for exhausting the burnt gases.

2. An internal combustion engine comprising a tight casing, a rotary screw within said casing and a chain of projecting elements meshing with the threads of said screw within said casing, said casing having a conical segment therein next the screws and axially coincident with said screw and at the side of the screw last passed by the chain elements, the threads of the screw being notched on the same side to slidably fit upon the said segment, the threads, segments and casing co-operating to form successive compression chambers having successive transition by virtue of the conical segment into successive expansion chambers.

3. An internal combustion engine comprising a tight casing, a rotary screw within said casing and a chain of projecting elements meshing with the threads of said screw within said casing, said casing having a conical segment therein next the screws and axially coincident with said screw and at the side of the screw last passed by the chain elements, the threads of the screw being notched on the same side to slidably fit upon the said segment, the threads, segments and casing co-operating to form successive compression chambers having successive transition by virtue of the conical segment into successive expansion chambers, said elements having walls engaging the faces of the threads and sloping and diverging to correspond therewith while the element passes between two threads.

4. An internal combustion engine comprising a tight casing, a helically threaded screw within said casing, a chain of interconnected, helical, thick projecting members, which chain follows a track of suitable shape by moving along one generatrix of said screw, means for drawing a gas mixture into working chambers formed between the threads of said screw together with the members and casing to compress the gas mixture on movement of said screw and chain, means for igniting the gas mixture in working chambers formed between the projecting elements of the chain together with the casing and a thread of the screw, and means for exhausting the burnt gases.

5. An internal combustion engine comprising a rotary cylindrical member, said member having on its periphery a plurality of helical grooves opening at its two ends, a tight casing for the cylindrical member, said casing having an inlet canal adapted for successively and directly communicating with the helical grooves of the cylindrical member, a plurality of movable hollow helical members adapted for successively traversing said grooves and forming with these grooves and with the walls of the casing working chambers of variable capacity, said casing providing a tight passage for the helical members and also providing an exhaust canal directly communicating with the said passage and means within the hollow helical members for igniting a gas mixture in the working chamber.

6. An internal combustion engine comprising a tight casing, a helically threaded screw within said casing, a plurality of chains of interconnected helical thick projecting members meshing with said screw and following respectively a track of suitable shape by moving along one generatrix of said screw, and the number of the said chains differing from the number of the threads of the screw, said members, screw threads and casing cooperating to form working chambers, means for drawing a gas mixture into the working chambers formed between the threads of said screw to compress the gas mixture on movement of said screw and chains, each working chamber upon attaining maximum compression of the mixture thereupon opening directly into an expansion chamber wherein the mixture may be exploded for producing an expansion of the expansion chamber and means for exhausting the burnt gases.

MAURICE COUSIN.